United States Patent Office 3,152,953
Patented Oct. 13, 1964

3,152,953
METHOD OF KILLING FISH WITH ANTIMYCIN
Frank M. Strong and Philip H. Derse, Madison, Wis., assignors to Wisconsin Alumni Research Foundation, Madison, Wis., a corporation of Wisconsin
No Drawing. Filed Mar. 13, 1962, Ser. No. 179,468
8 Claims. (Cl. 167—46)

The present invention relates to a new method for killing fish and more specifically to the killing of fish in lakes, ponds, streams and the like, by adding to the water compositions of the anti-fungal antibiotic, antimycin, as described below.

The antibiotic, antimycin, and in particular antimycin A, along with its method of preparation is described in Keitt et al. Patent 2,657,170. The antibiotic is anti-fungal in character and, as pointed out in the Keitt et al. patent, supra, antimycin can be used as a fungicide for the control of certain plant diseases.

Antimycin can be prepared as described in the Keitt et al. patent or as reported in the literature. See E. R. Squibb Lectures on Chemistry of Microbial Products, Topics in Microbial Chemistry, F. M. Strong, John Wiley & Sons, Inc. (1958). One of the preferred methods follows the general procedure of the example in the Keitt et al. patent using an aqueous medium containing soybean oil meal and glucose. In addition to the organism NRRL No. 2288 referred to in the Keitt et al. patent, other antimycin producing organisms can also be used. See E. R. Squibb (F. M. Strong) Lectures, supra.

The killing of unwanted species of fish such as the sea lamprey and the so-called "rough-fish," such as carp, gar, dog-fish, etc., in lakes, ponds, streams and the like prior to restocking with desired species of fish has posed problems. One problem involved the finding of a toxic substance which would kill fish at relatively high dilutions. This is essential, as a substance which requires relatively high concentrations to kill, would be economically unfeasible. Also, due to the large amounts of water in ponds, lakes and streams, the toxic substance, in addition to being effective at extremely high dilutions, should be low in cost. Another and important problem involved the finding of a low cost toxic substance in which the toxic principle would disappear in the water in a reasonably short time. This has been one of the main if not the primary problem, as the toxic principles of toxic substances proposed heretofore for killing fish have been found to be stable and to poison the water for months up to several years. This delays restocking of the water for like periods and increases the hazard inherent in toxic substances.

In our investigations we discovered that low cost crude antimycin compositions would kill fish at extremely high dilutions of antimycin, e.g., 0.1 p.p.b. or even lower for some species of fish. We also discovered that more rapid kills could be obtained by using higher concentrations, e.g., 1–10 p.p.b. up to 100 p.p.b. of antimycin. In our investigations, we further discovered that the toxic principle in the low cost crude antimycin compositions, disappears in pond, lake and stream waters in a relatively few days. For example, water to which crude antimycin compositions had been added to provide 1.0 p.p.b. of antimycin failed to kill certain species of fish after about one day, and water to which crude antimycin compositions had been added to provide 100 p.p.b. of antimycin, failed to kill fish after about six days. This rapid disappearance of toxicity was unexpected as antimycin is produced in an aqueous medium.

The following examples are illustrative methods of preparing low cost, effective antimycin compositions for use in the present invention.

*Example I*

To an antimycin containing culture broth produced in accordance with Example I of the Keitt et al. patent, supra, and containing the mycelium produced during the culturing of the antimycin producing organism, is first added sufficient concentrated hydrochloric acid to provide the broth with a pH of about 3. The acidified broth is then filtered through diatomaceous silica (Celite) or like filter aid and the filtrate discarded. The resulting filter cake containing antimycin, mycelium and the inert finely divided diatomaceous particles is then ground or broken up and mixed well to provide a uniform finely divided mixture. The resulting mixture which may be air dried, contains the antimycin-mycelium combination and is a preferred composition for killing fish.

*Example II*

This example is in accordance with the general procedure of Example I, except that a finely divided filter aid, e.g., kieselguhr, is added to the fermented antimycin-mycelium containing culture broth and the broth is then acidified and filtered. The resulting filter cake made up of the insoluble material (antimycin, mycelium and diatomaceous earth) is then formed into a uniform powdered mixture as in Example I.

*Example III*

This example is in accordance with Examples I or II, except that the filter cake is extracted with acetone and the resulting crude acetone solution of antimycin is used to kill fish. In this procedure a water-miscible solvent should be used and, of this type of solvent, acetone is preferred as antimycin has been found to be particularly stable in acetone. Ethanol and like water-miscible organic solvents, however, can be used.

*Example IV*

This example is in accordance with Example III, except that the filter cake is extracted with benzene or like water-immiscible solvent, the solvent is evaporated and the resulting crude antimycin product is mixed with an inert diluent or carrier and a surfactant or wetting agent to provide a composition containing by weight about 1–5% antimycin and about 5% surfactant. Purified antimycin can also be used in similar formulations but its use is not recommended due to the relatively higher cost of purified antimycin. Where solvent extraction is used, and the solvent is removed, or partially removed, to provide crude antimycin or concentrates of the same, the solvent can be recovered and reused for other extractions.

*Example V*

This example is in accordance with Examples I and II, except that a small amount, e.g., 1% to 5%, of a surfactant such as Aerosol OT (dioctyl sodium sulfosuccinate) is added to the crude antimycin composition containing the mycelium and the diatomaceous earth. Compositions such as illustrated by Examples IV and V, and containing a surfactant which aids in dispersing the composition in the water, are also of the preferred type for use in the present invention. Any of the commercially available surfactants or wetting agents can be used, with optimum amounts being readily ascertainable by preliminary test.

The crude antimycin-mycelium fermented culture broth or concentrates of the same or the antimycin containing mycelium can also be used as such, preferably after the mycelium has been broken up into finely divided particles or cells by treatment in a Waring Blendor or similar equipment. In general, however, whether using the fermented culture broth itself, or the antimycin-mycelium mixture, or the insoluble material after acidification of the fermented broth, it is preferred to use, as a diluent or carrier, finely divided diatomaceous earth with the resulting antimycin-mycelium combination. While the commonly used inorganic, water-insoluble filter aid materials which are heavier than water are generally preferred for this purpose, any inert material which dissolves or disperses in water, e.g., emulsified methyl and dimethyl naphthalenes, can be used as the diluent or carrier.

The toxicity of the crude antimycin compositions for different species of fish varies somewhat and can be illustrated by the following.

Common goldfish, in tap and lake water, with 100; 10 and 5 p.p.b. of antimycin, were all killed in 24 hours. With 1 p.p.b. of antimycin all fish were dead in 48 hours.

White mullet (*Mugil curema*), and longnose killifish (*Fundulus smilis*), in sea water, were all killed with 1.0 p.p.b. and 0.1 p.p.b. of antimycin.

Trout, in fresh water, the $LD_{50}$ for 18 hours was $0.25 \pm 0.08$ p.p.b. of antimycin. At 0.37 p.p.b. all trout were killed in 18 hours and at 0.5 p.p.b. all fish were dead in 2 hours.

In general, for most purposes, it is preferred to use the crude compositions so as to provide antimycin in concentrations of about 1 to 10 p.p.b. Lower concentrations, e.g., 0.1 p.p.b., however, can be used, as noted above, but concentrations much below 0.2 p.p.b. are not recommended due to the relatively rapid disappearance of the toxic principle. Higher concentrations up to 100 p.p.b. can also be used but are not recommended as concentrations around 10 p.p.b. are generally more than adequate to provide for the desired rapid kills. In all cases, however, the optimum antimycin concentrations for killing a particular species of fish with the crude antimycin compositions can be readily determined by preliminary test.

As noted above, and of utmost importance, the toxic residue poses no serious problem as the toxicity of the antimycin is dissipated and disappears in a relatively short period of time. This is illustrated by the following.

Water (fresh) containing 1 p.p.b. of freshly added antimycin killed goldfish in 48 hours, while the same water containing 1 p.p.b. of antimycin and aged for one day, failed to kill the fish. Water (fresh) containing 100 p.p.b. of freshly added antimycin killed goldfish within 24 hours, while the same water containing 100 p.p.b. of antimycin and aged for seven days, failed to kill the fish. These data show that the toxic principle in the crude antimycin compositions is unstable in water and that water containing as high as 100 p.p.b. of antimycin can be safely restocked with fish in about a week after adding the lethal dose of antimycin. As species of fish, however, differ, e.g. sea water containing 0.1–1.0 p.p.b. of freshly added antimycin is still toxic to the longnose killifish after 24 hours but not after five days, the water to which the crude antimycin composition has been added should be checked for the presence of the toxic principle before restocking with a particular species of fish.

We claim:

1. The method of killing fish in pond, lake, stream and like waters which comprises adding to the water a crude antimycin-mycelium mixture in a finely divided water-insoluble inert inorganic diluent.

2. The method of claim 1, where the composition added to the water contains a small amount of a surfactant to aid in dispersing the composition in the water.

3. The method of claim 1 where the diluent is diatomaceous earth.

4. The method of killing fish in water which comprises adding to the water a solution of crude antimycin in a water-miscible organic solvent.

5. The method of claim 4 where the water-miscible solvent is acetone.

6. The method of killing fish in water which comprises adding to the water a crude antimycin composition comprising an antimycin-mycelium containing culture broth.

7. The method of killing fish in pond, lake, stream and like waters which comprises adding to the water a composition containing, as an essential ingredient, antimycin.

8. The method of claim 7, where the composition contains an inorganic diluent heavier than water.

References Cited in the file of this patent

UNITED STATES PATENTS 2,657,170 Keitt et al. ------------ Oct. 27, 1953